United States Patent
Hoffschulz et al.

(10) Patent No.: US 7,203,695 B2
(45) Date of Patent: Apr. 10, 2007

(54) METHOD AND SYSTEM FOR USING A FRAMEWORK TO IMPLEMENT AN AUDIT PROCESS

(75) Inventors: Henning Hoffschulz, Schwetzingen (DE); Volker Albert, Leimen (DE); Karin Busch, Harthausen (DE); Bodo von Glahn, Steinsfurt (DE)

(73) Assignee: SAP AG, Walldorf (DE)

( * ) Notice: Subject to any disclaimer, the term of this patent is extended or adjusted under 35 U.S.C. 154(b) by 527 days.

(21) Appl. No.: 10/391,768

(22) Filed: Mar. 20, 2003

(65) Prior Publication Data
US 2004/0194052 A1  Sep. 30, 2004

(51) Int. Cl.
*G06F 17/30* (2006.01)
*G06F 17/00* (2006.01)

(52) U.S. Cl. .................. 707/102; 707/3; 707/101; 707/103 Y; 707/104.1

(58) Field of Classification Search .......... 707/3, 707/10, 101, 102, 103 X, 104.1, 103 Y, 202; 705/38; 715/530
See application file for complete search history.

(56) References Cited

U.S. PATENT DOCUMENTS

| | | | |
|---|---|---|---|
| 6,643,625 B1 * | 11/2003 | Acosta et al. ............ | 705/38 |
| 6,725,240 B1 * | 4/2004 | Asad et al. ............ | 707/202 |
| 2003/0050936 A1 * | 3/2003 | Wainwright ............ | 707/104.1 |
| 2004/0177326 A1 * | 9/2004 | Bibko et al. ............ | 715/530 |

OTHER PUBLICATIONS

Miami University DARS Degree Audit Reporting System, "DARS Informational Paper," [online], [retrieved on Sep. 26, 2003] Retrieved from the Internet: <URL: http://www.dars.muohio.edu/DARS_Informational_Paper.htm>.

Decision Academic Graphics Inc., (DAG), Student Information Systems products: "Degree Navigator, Registration Navigator, Transfer Navigator," [online], [retrieved on Sep. 26, 2003] Retrieved from the Internet: <URL: http://www.dagsoft.com/docs/dn_tn_m_2001.pdf>.

Flexnow, [online], [retrieved on Oct. 6, 2003] Retrieved from the Internet: <URL: http://flexnow.uni-bamberg.de/produkt/funktionalitaet.htm>.

* cited by examiner

*Primary Examiner*—Thuy N. Pardo
(74) *Attorney, Agent, or Firm*—Kenyon & Kenyon LLP

(57) ABSTRACT

A method and system using a framework to implement an audit process. An embodiment of a method for using a framework for implementing an audit process includes storing a set of requirements associated with a first audit type, receiving an input of a second audit type, and associating at least one of the requirements with the second audit type. The method enables a processor to define different types of audits and assign at least one requirement to the different types. As such, the processor may create a requirement only once. Exemplary applications include educational institution audits for admissions and degree completion.

4 Claims, 14 Drawing Sheets

FIG. 13

METHOD AND SYSTEM FOR USING A FRAMEWORK TO IMPLEMENT AN AUDIT PROCESS

BACKGROUND

Auditing generally involves comparing a set of requirements against a set of actual data in order to determine whether the data complies with the requirements or how much progress has been made toward a desired objective defined by the requirements. As such, an audit can provide valuable information, so that the auditor may take active steps toward correcting any deficiencies reflected in the data.

Audits can be particularly useful in environments that are requirement-intensive. The educational system is one such environment. Students must meet certain academic requirements in order to progress from one level to another and ultimately to graduate. So, it is helpful to the student to gauge her progress as she advances in the institution. For this reason, several systems have been developed to perform degree audits for university students.

These systems typically provide reports to administrators, academic advisors, and students regarding the students' progress toward a degree. Such reports may include the necessary courses a student has remaining in order to complete a degree or any prerequisites and corequisites that a student must take during a calendar year, for example. Additionally, students may engage in "what if" audits to determine the students' progress toward a different degree. Universities use these systems to proactively manage the students' curricula.

There are shortcomings associated with these degree audit systems, however. First, these systems are narrowly designed for only degree audits and are not reconfigurable to handle other types of audits. For example, degree audit systems do not have routines in place that allow for different system inputs, even though there are a variety of activities, events, and organizations within the educational environment, having certain requirements which must be met, that could benefit from inclusion in such audit systems. Second, even if an audit system could be reconfigured to perform different types of audits, the effort and expense to do so could be prohibitively high. For example, a processor could be required to create an entire new set of requirements, new procedures, and new data structures for the new system, which could be time- and labor-intensive.

Accordingly, there is a need in the art for systems that are flexible enough to provide different types of audit processes and to reuse audit requirements between the different audit types.

SUMMARY OF INVENTION

Embodiments of the present invention provide a framework for implementing different types of audit processes in the same system. A method for using the framework to implement different audit processes does so by allowing a processor to create different types of audits and assign at least one common requirement to the different types. As such, the processor need create a requirement only once. The framework may comprise requirement objects that represent the requirements, subrequirement objects that represent the subrequirements of a particular requirement, and audit objects that represent entities having requirements to be met, the audit objects including attributes specifying the audit types to be performed thereon.

Embodiments of the present invention also provide a system upon which different types of audit processes may be implemented. The system may include a memory for storing the sets of requirement objects associated with different audit types, a processor for assigning at least one common requirement to the different audit types, and a graphical user interface that a developer may use to interact with the processor to implement the different audit types.

BRIEF DESCRIPTION OF DRAWINGS

FIG. 13 is an illustration of an embodiment of a user interface for assigning requirements to audit objects.

DETAILED DESCRIPTION

Figure 1:
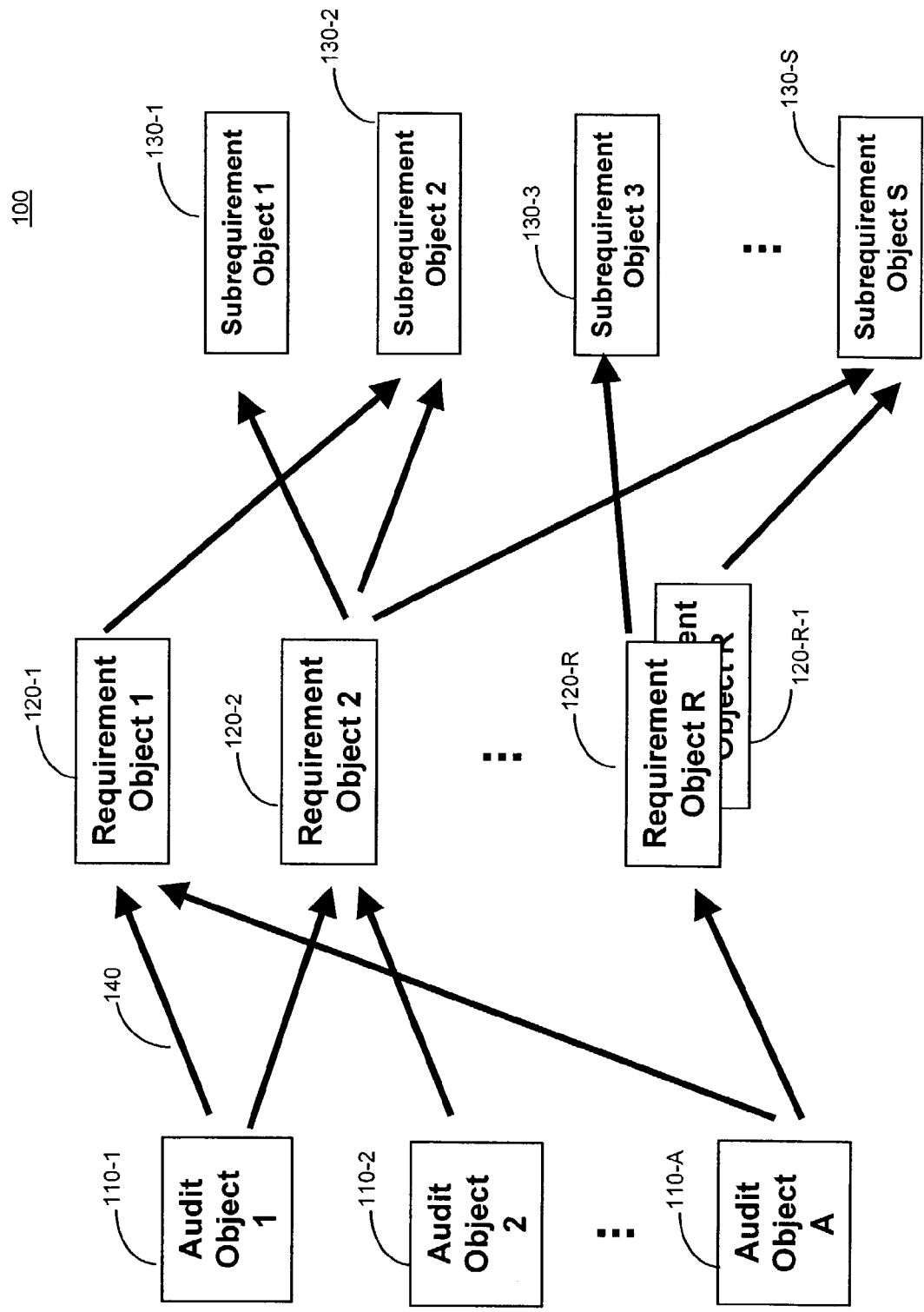
FIG. 1 is a diagram of an embodiment of a framework used to implement an audit process according to the present invention.

Embodiments of the present invention provide a method and system using a framework to implement different audit processes. Generally, an audit process involves comparing a set of requirements with a corresponding set of data to determine if the data satisfies the requirements. A typical comparison may include Boolean tests, e.g., "true/false" or "yes/no", and threshold tests, e.g., "if A is greater than threshold B." If the data satisfies a predefined number of requirements, then the audited entity has passed the audit. Conversely, if the data fails to satisfy a predefined number of requirements, then the audited entity has failed the audit.

Almost any entity has a set of requirements to be met in order to fulfill some objective or purpose of the entity. Educational institutions have admission requirements that an applicant must meet in order to be admitted to the institution. Accordingly, an admission audit may be performed on the applicant's academic background. Educational institutions also have degree requirements that a current student must meet in order to graduate. So, a degree audit may be performed on the student's record. Organizations and divisions within the educational institution, e.g., a program of study, a football team, etc., may also have their own requirements for reaching a certain objective. Additionally, businesses have hiring requirements that must be met in order for a potential employee to be hired. Hence, an employment audit may be performed on the potential employee's background. Businesses also have performance requirements that the employee must meet in order to receive a raise or promotion. Thus, a performance audit may be conducted on the employee's record. Also, people have financial requirements to be met in order to reduce taxes, for example. Hence, a tax audit may be performed on the person's financial records.

In embodiments of the present invention, educational institutions, businesses, people, and like entities are called audit units. Audit units are generally entities that have sets of requirements that must be met for some purpose of the entity. These audit units may be represented by audit objects in the framework of the present invention. Also in embodiments of the present invention, the admissions, degree, employment, performance, tax, and like audit processes are called audit types. Audit types may be represented as attributes of the audit objects in the framework. The admission, degree, hiring, performance, financial, and like requirements may be represented by requirement objects in the framework of the present invention. Many of these requirements may have subrequirements which define lower level aspects of the requirements. In these embodiments, subrequirements may be represented by subrequirement objects in the framework.

As will be discussed later, different entities may have different requirements and/or one entity may have different requirements for different types of audits. For example, educational institutions may have different requirements than private businesses. And, educational institutions may have different requirements for admissions and degree completion. Conversely, different entities may have some of the same requirements and/or one entity may have some of the same requirements for different types of audits. Accordingly, these same requirements may advantageously be reused by different entities and in different audit types. And, multiple audit types may be advantageously performed on the same entity.

In embodiments of the present invention, a processor may use the framework to create and/or retrieve a set of requirements for a first audit type. The processor may then create and/or specify a second audit type, having some of the same requirements as the first type of audit. The processor may then assign these same requirements to the second audit type without having to copy or create redundant requirements. Hence, these embodiments advantageously enable a processor to create different audit processes and reuse requirements for the different audit processes, thereby eliminating object redundancy and reducing framework and implementation complexity.

FIG. 1 shows an embodiment of a framework used to implement an audit process according to the present invention. The framework 100 may include, but is not limited to, audit objects 110-1 . . . A, requirement objects 120-1 . . . R, and subrequirement objects 130-1 . . . S, linked singly or multiply to each other via references or assignments 140. An audit object 110 represents an entity for which certain requirements are to be met for some purpose of the entity.

A requirement object 120 represents the requirements to be met. For example, a program of study requirement may be "Must complete courses in English." As shown in FIG. 1, any requirement may be associated with any audit object 110 based on the audit type performed on the audit object. This association may be defined by an attribute of the audit object 110 called a "call-up point." Call-up points will be described in FIG. 2. Additionally, a requirement object may have different versions, as illustrated by requirement objects 120-R and 120-R-1. These different versions may occur when there is a slight modification to one or more components of the requirement object. For example, different versions of the requirement object 120-R, 120-R-1 may have different subrequirement objects 130 associated therewith. In these cases where there are different versions of the requirement object 120, one audit object 110 may use one version of the requirement object 120 and another audit object 110 may use another version of the requirement object 120. Or one audit object 110 may use multiple versions of the requirement object 120. These different versions are often found when performing educational institution audits, where admission requirements are updated every year to adjust GPA or entrance exam score requirements, for example.

A subrequirement object 130 represents subsets or lower-level components of a requirement to be met. For example, for the program of study requirement "Must complete courses in English," its subrequirements may be "5 credits in English Composition," "6 credits in English Composition," "5 credits in English History," and "English paper must be written." As shown in FIG. 1, any subrequirement may be associated with any requirement object 120 based on what the requirement object 120 defines. Additionally, any subrequirement may be associated with any version of a requirement object 120-R, 120-R-1 based on what the requirement object 120 defines.

In the example, the program of study requirement "Must complete course in English" may have 2 different versions. In version 1 of the requirement, its subrequirements may be "5 credits in English Composition," "5 credits in English History," and "English paper must be written." Accordingly, the requirement object 120 for version 1 may be associated with the subrequirement objects 130 representing these three subrequirements. In version 2 of the requirement, its subrequirements may be "6 credits of English Composition" and "5 credits of English History." Thus, the requirement object 120 of version 2 may be associated with the subrequirement objects 130 representing these two subrequirements.

Such an implementation of audit processes of the present invention may provide possible linking of the same requirement and/or subrequirement object to multiple other objects, such that the same object may be reused in different audits after defining the object once. Additionally, different audit processes may easily be implemented for the same entity. The ability to reuse objects and create different audit processes reduces the complexity of the framework, makes the implementation of the audit processes easier, both in time and effort, for the processor, and provides efficient management of memory and other resources.

Figure 2:
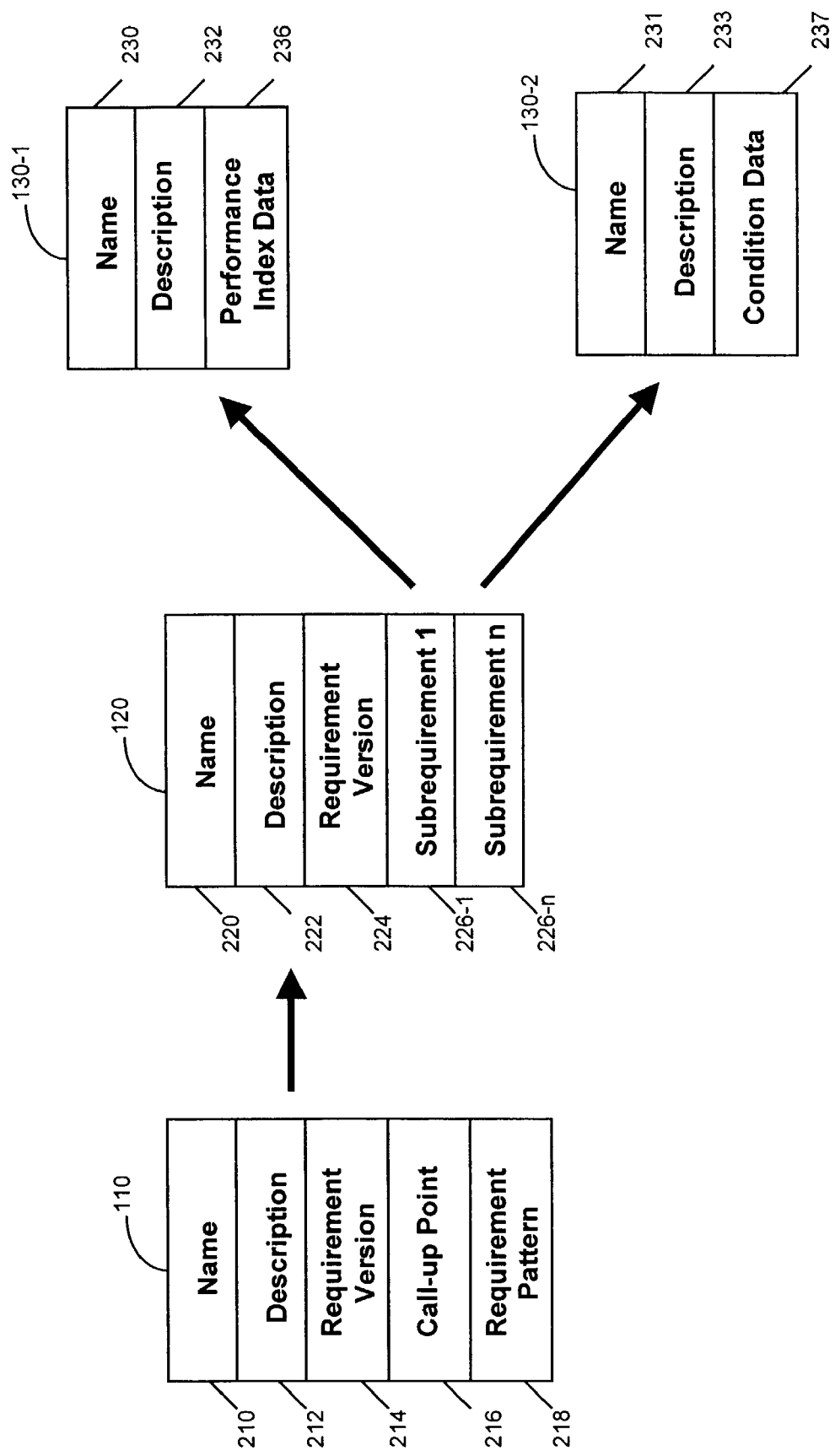
FIG. 2 is a diagram of embodiments of objects comprising the framework of the present invention.

FIG. 2 shows a diagram of embodiments of the objects comprising the framework of the present invention. The framework 100 includes, but is not limited to, the audit object 110, the requirement object 120, and two variations of the subrequirement object 130.

The audit object 110 may include, but is not limited to, a name 210, a description 212, version(s) of the set(s) of requirements to be used 214, call-up point(s) 216, and name(s) of the requirement pattern to be used 218. The call-up point 216 may be a key or any like structure, which indicates the audit type that the audit object 110 may conduct and identifies for which audit type a requirement object 120 may be used. Accordingly, the call-up point 216 may be used by the processor as a way for the processor to easily identify and link particular requirement objects 120 with audit objects 110 via the audit type. Since the audit object 110 may conduct several different audits, e.g., an admission audit or a degree audit, and each audit may have different requirements, the audit object 110 may have several call-up points 216, one for each audit type. Along with each call-up point 216, the version 214 and name 218 of the requirement pattern that make up the particular audit type (referenced by the call-up point 216) may be defined in the audit object 110.

The requirement pattern may include abstract requirements as placeholders for specific requirements. That is, the requirement pattern may provide an abstract representation, which, during implementation, may select the specific requirement objects 120 to be used for a particular audit type by an audit object 110.

It is to be understood that the components of the audit object 110 are for exemplary purposes only, as other components may be included according to the uses of the audit object.

The requirement object 120 may include, but is not limited to, a name 220, a description 222, version(s) of the requirements to be used 224, and name(s) of the subrequirement(s) to be used 226-1, 226-n. It is to be understood that the components of the requirement object 120 may vary depending on the uses of the requirement object.

The subrequirement object 130 may be of at least two different types. These include an index-dependent subrequirement object 130-1 and an index-independent subrequirement object 130-2. An index-dependent subrequirement object 130-1 represents a subrequirement that performs a calculation in order to determine whether the subrequirement has been met. The calculation may include calculating a key value based on input data, determining a nominal value of the subrequirement, and then comparing the key value against the nominal value, where the result of the comparison determines whether the subrequirement has been met. In the previous example of the subrequirement "5 credits in English Composition," the index-dependent subrequirement object 130-1 would calculate as a key value the student's actual number of credits in English Composition, determine that the nominal value is 5 credits, and then compare the actual number with the nominal value. If the student's number of credits equaled or exceeded 5, then the subrequirement object 130-1 would indicate that the subrequirement had been met.

In an embodiment of the present invention, the index-dependent subrequirement may include, but is not limited to, a name 230, a description 232, and performance index data 236 to be used to perform the calculation. The performance index data 236 may include filters, parameters, nominal values, performance indices, and selection methods. Filters may be search routines to find data to be evaluated based on specified search parameters. Nominal values may be the values to be reached in order for the subrequirement to be met. Performance indices may be calculations to be performed to determine a nominal value or to quantify the filtered data, for example. Selection methods, which may also be represented by objects, may be used to select and suggest solutions for meeting the subrequirement.

A second type of subrequirement object 130 is the index-independent subrequirement object 130-2. The index-independent subrequirement object 130-2 represents a subrequirement that checks whether a condition is met in order for the subrequirement to be satisfied without performing the calculations as in the index-dependent objects 130-1. The condition check generally results in Yes, No, or In Progress. In the previous example of the subrequirement "English paper must be written," the subrequirement object 130-2 would check whether the student did indeed write the paper and return a result accordingly.

In an embodiment of the present invention, the index-independent subrequirement object 130-2 may include, but is not limited to, a name 231, a description 233, and condition data 237 to be used to perform the condition check. The condition data 237 may include filters, parameters, conditions, and selection methods. The filters, parameters, and selection methods may be the same as those previously described regarding the index-dependent objects 130-1. Conditions may be those to be met in order for the subrequirement to be satisfied.

It is to be understood that the components of the subrequirement object 130 may vary depending on the uses of the subrequirement object.

Figure 3:
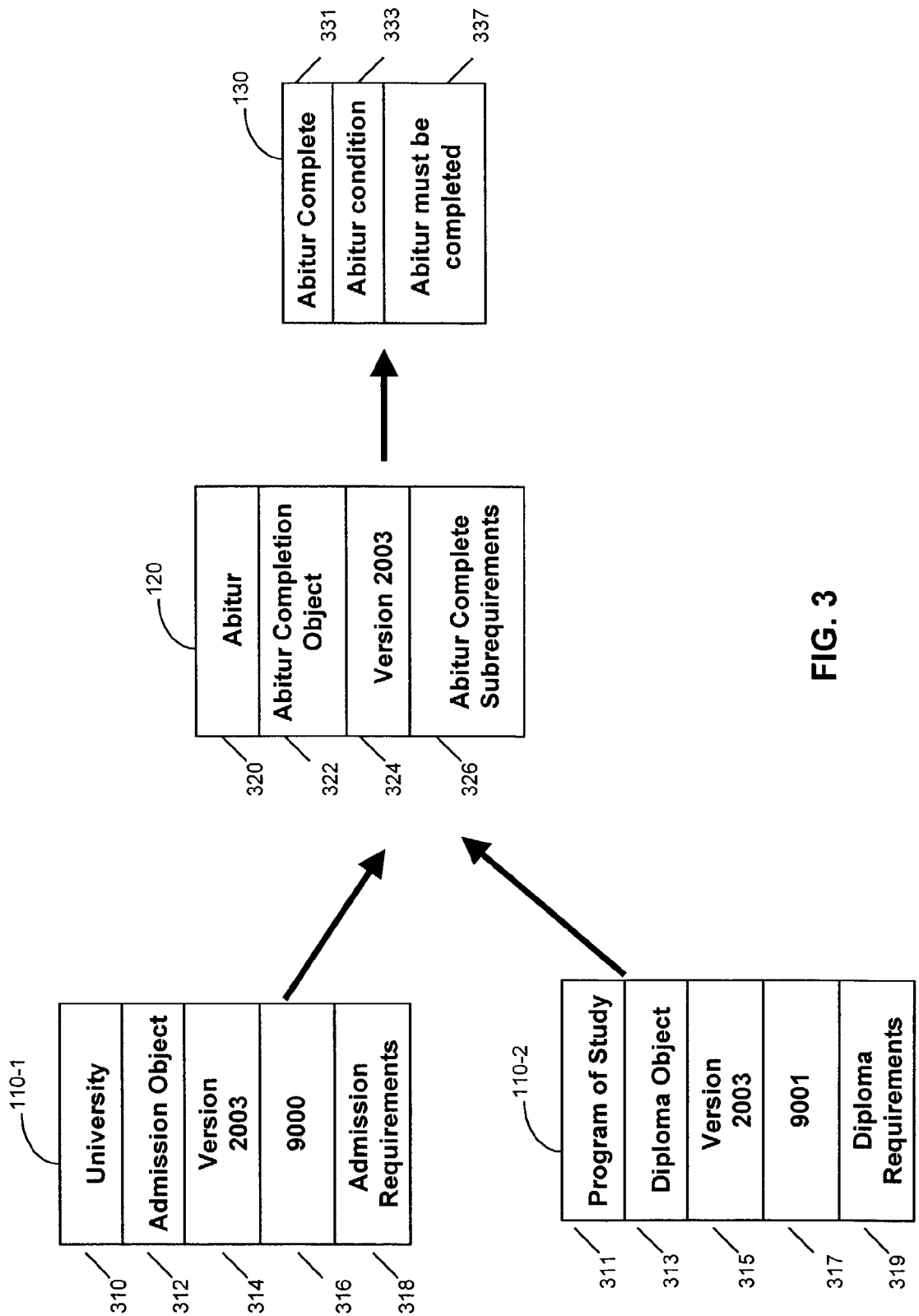
FIG. 3 is a diagram of an example of the framework used for implementing an audit process according to the present invention.

FIG. 3 is an example of using a framework to implement an audit process according to the present invention. This example describes two audit processes that may take place in a German university regarding admission to the university and sitting for the diploma exam. In a German university, a student may be admitted only after completing the highest high-school qualification, called an "Abitur." And a student may sit for the diploma exam only after completing the course of study at the university, including completing the Abitur. Hence, for both admissions and the diploma exam, completing the Abitur is a requirement that the student must meet. During an audit process in each of these cases, a determination is made as to whether the student has met the Abitur requirement.

Using the framework of the present invention, two types of audit processes, an admission audit and a diploma exam audit, may be implemented. To do this, first, audit objects may be generated to represent each of these entities that have requirements to be met. A first audit object 110-1 may be created to represent the German university, including the admission requirements. A second audit object 110-2 may be created to represent the German university program of study, including the degree requirements. The first audit object 110-1 may be named "University" 310 and have a description 312 of "Admission object." The type of audit to be performed by this audit object is an admission audit. So, the call-up point 316 for an admission audit is defined and, in this example, designated with the value of 9000. The version 314 of the requirements to be used in an admission audit is the 2003 version. And the requirement pattern 318 for an admission audit, including the Abitur requirement, is called "Admission Requirements." The second audit object 110-2 may be named "Program of Study" 311 and have a description 313 of "Diploma object." The type of audit to be performed by this audit object is a diploma exam audit. So, the call-up point 317 for a diploma exam audit is defined and, in this example, designated with the value of 9001. The version 315 of the requirements to be used in a diploma exam audit and the requirement pattern 319 for a diploma exam audit, including the Abitur requirement, may be set.

Next, the Abitur requirement object 120 may be generated and linked to audit objects 110-1, 110-2 through their respective call-up points 316, 317. The requirement object 120 represents the Abitur completion requirement. The requirement object 120 may include the name "Abitur" 320, a description 322 of "Abitur completion object," the version 324 of the requirement to be used, and the name 326 of the subrequirement to be used.

The subrequirement object associated with the requirement object 120 is an index-independent subrequirement object 130, which has a condition to be checked. In this case, the condition is whether the Abitur has been completed. The subrequirement object 130 may include a name 331, a description 333, and the condition data 337. Here, the condition data includes the condition "Abitur must be completed."

This example illustrates some advantages of the embodiments of the present invention. In this implementation of the framework 100, two different audit types may be implemented, i.e., the admission audit and the diploma exam audit. Additionally, any instances of the two audit objects 110-1, 110-2 performing the admission and diploma exam audits, respectively, may inherit the requirement object 120 and the associated subrequirement object 130. As such, the Abitur completion requirement may be checked for any student who applies to the university and who sits for the diploma exam. Hence, the requirement object 120 and subrequirement object 130 need not be replicated for the two audit objects 110-1, 110-2.

Embodiments of the present invention may be implemented using any type of computer, such as a general-purpose microprocessor, programmed according to the teachings of the embodiments. The embodiments of the present invention thus also includes a machine readable medium, which may include instructions, which may be used to program a processor to perform a method according to the embodiments of the present invention. This medium may include, but is not limited to, any type of disk including floppy disk, optical disk, and CD-ROMs.

Figure 4:
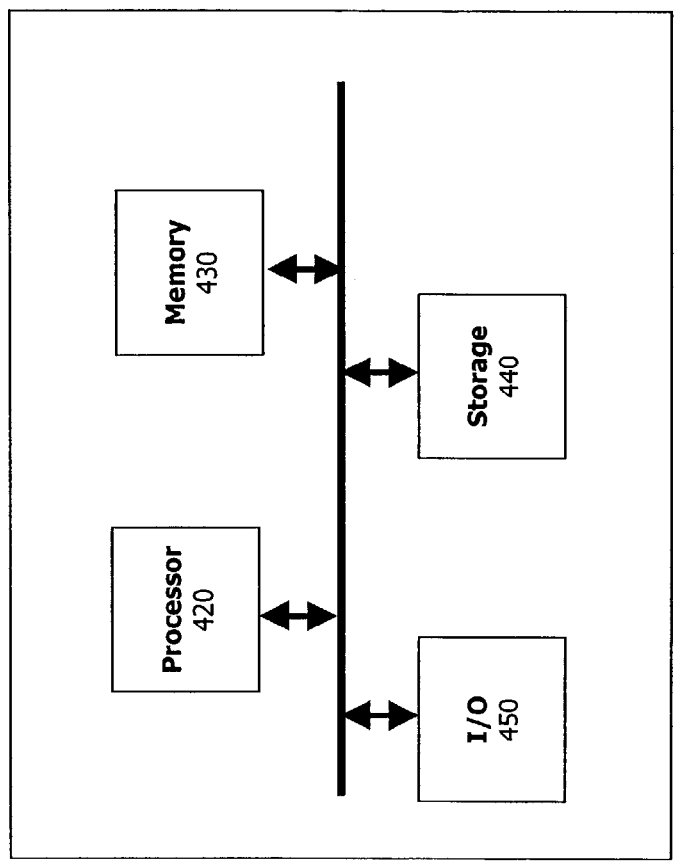
FIG. 4 is an exemplary computer system for implementing an embodiment of the present invention.

FIG. 4 is a block diagram of one embodiment of a computer system that can implement embodiments of the present invention. The system 400 may include, but is not limited to, a processor 420 provided in communication with a system memory module 430, a storage device 440, and an I/O device 450. Conventionally, the memory 430 may store program instructions to be executed by the processor 420 and also may store variable data generated pursuant to program execution. In practice, the memory 430 may be a memory system including one or more electrical, magnetic, or optical memory devices.

Figure 5:
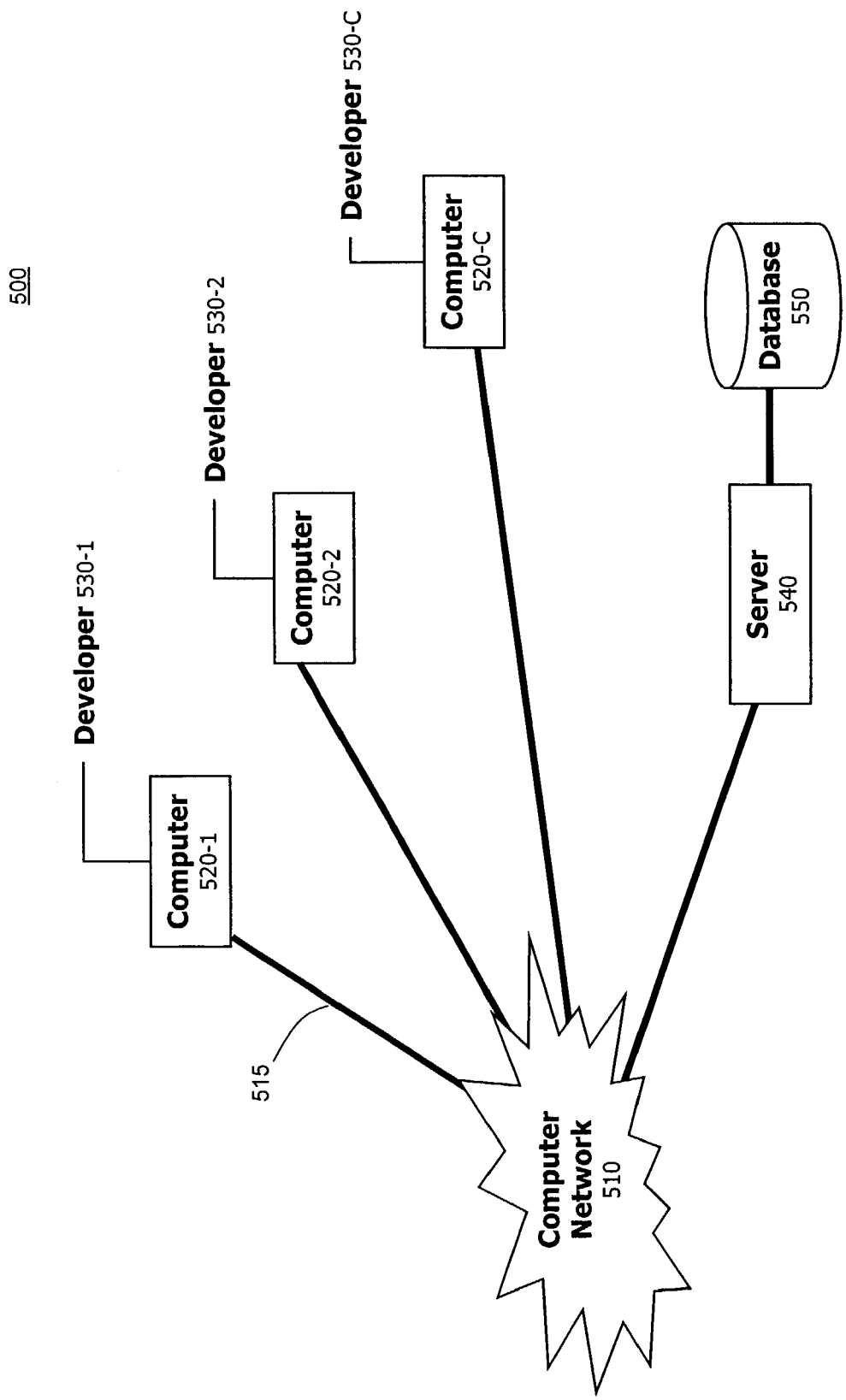
FIG. 5 is an exemplary computer network for implementing an embodiment of the present invention.

Embodiments of the present invention may be implemented on a network such as that shown in FIG. 5. The exemplary network system 500 may include, but is not limited to, a computer network 510, computers 520-1 . . . 520-C used by respective developers 530-1 . . . 530-C to implement different types of audit processes for their entities, a server 540 housing a framework, and a database 550 storing various data and records used by the framework. These components may be linked to the network 510 via network links 515. The network 510 may be a LAN, WAN, Internet, or any like structure capable of connecting components and transmitting data. The network links 515 may include physical wiring, wireless connections, or any like transmission configuration capable of transmitting data.

Figure 6:
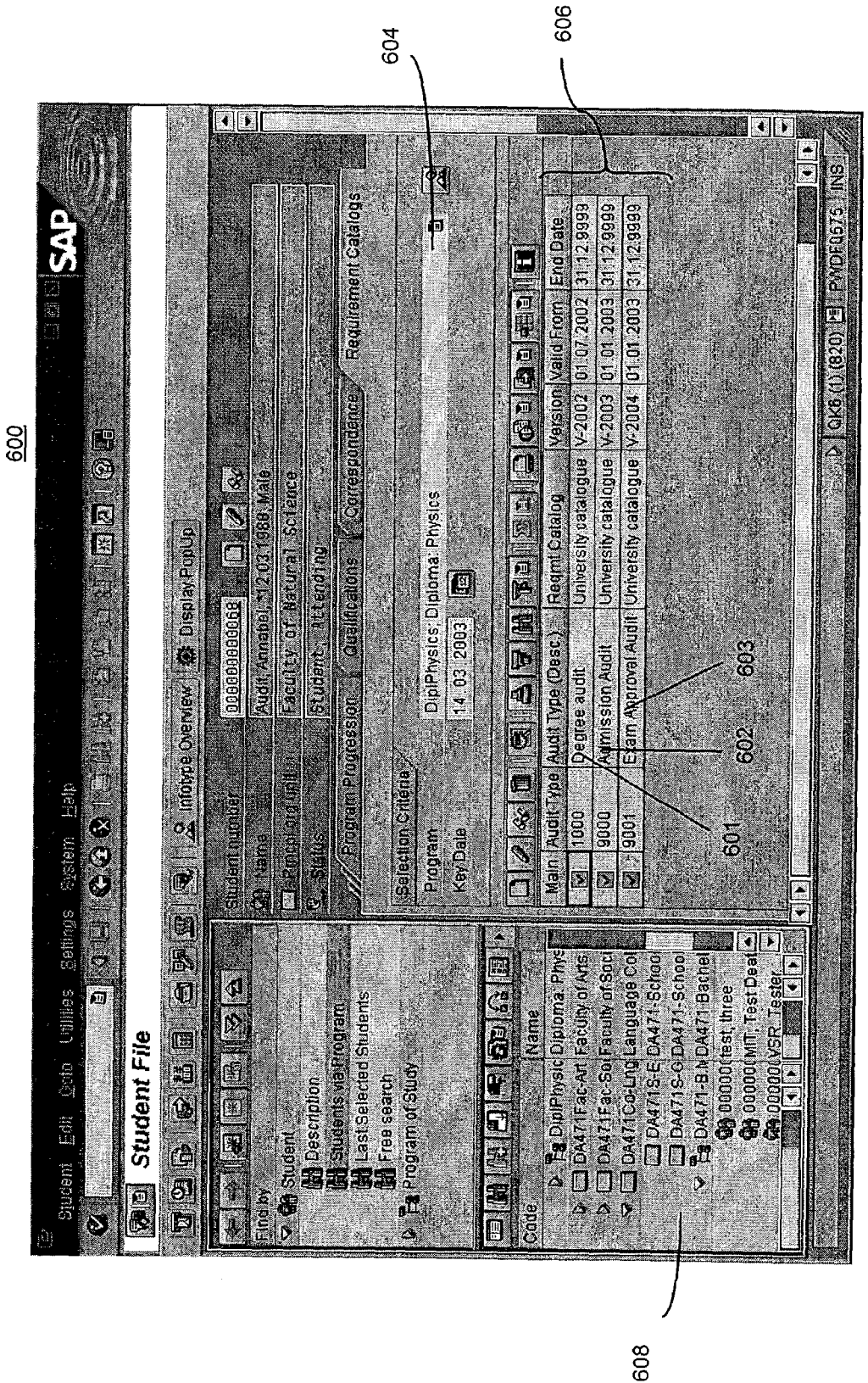
FIG. 6 is an illustration of an embodiment of a user interface displaying an exemplary audit object developed on a framework according to an embodiment of the present invention.

Embodiments of the present invention may provide a graphical user interface for a developer to interact with the processor 420 in order to implement the different audit processes. FIG. 6 shows an embodiment of a user interface displaying an exemplary audit object developed on a framework according to an embodiment of the present invention. This illustration shows an example of what an implementation on the framework might look like. In this example, the specified entity is a program of study in Physics. Accordingly, the processor 420 has defined an audit object 604 to represent the program of study.

The processor 420 has also defined three different types of audits 606 that may be performed on this program of study. Here, the user interface illustrates a degree audit 601, an admission audit 602, and an exam approval audit 603. The degree audit 601 may determine whether a student has met the requirements necessary to graduate from the Physics program. The admission audit 602 may determine whether a student has met the requirements necessary to be admitted to the Physics program. The exam approval audit 603 may determine whether a student has met the requirements necessary to sit for the diploma exam in the Physics program. Each of these audit types has requirements, some in common, associated with them. The version of these requirements may be specified, as shown under the "Version" heading of the audit types 606. Requirement objects 608 represent these requirements. These requirement objects 608 use the call-up points of the appropriate audit type (1000 for degree audit, 9000 for admission audit, and 9001 for exam approval audit) to link back to the audit object 604.

In order to develop the audit processes using the graphical user interface, the processor 420 may employ the following four procedures: defining audit types (with call-up points), specifying entities that have requirements (audit objects), defining requirements and subrequirements (requirement and subrequirement objects), and linking requirements to entities based on the audit types (requirement and subrequirement objects to audit objects via call-up points). FIGS. 7–13 show exemplary implementations of these procedures through a series of graphical user interface illustrations. It is to be understood that the procedures themselves and their implementation order are not limited to those described above, but may vary according to the implementing system.

Figure 7:
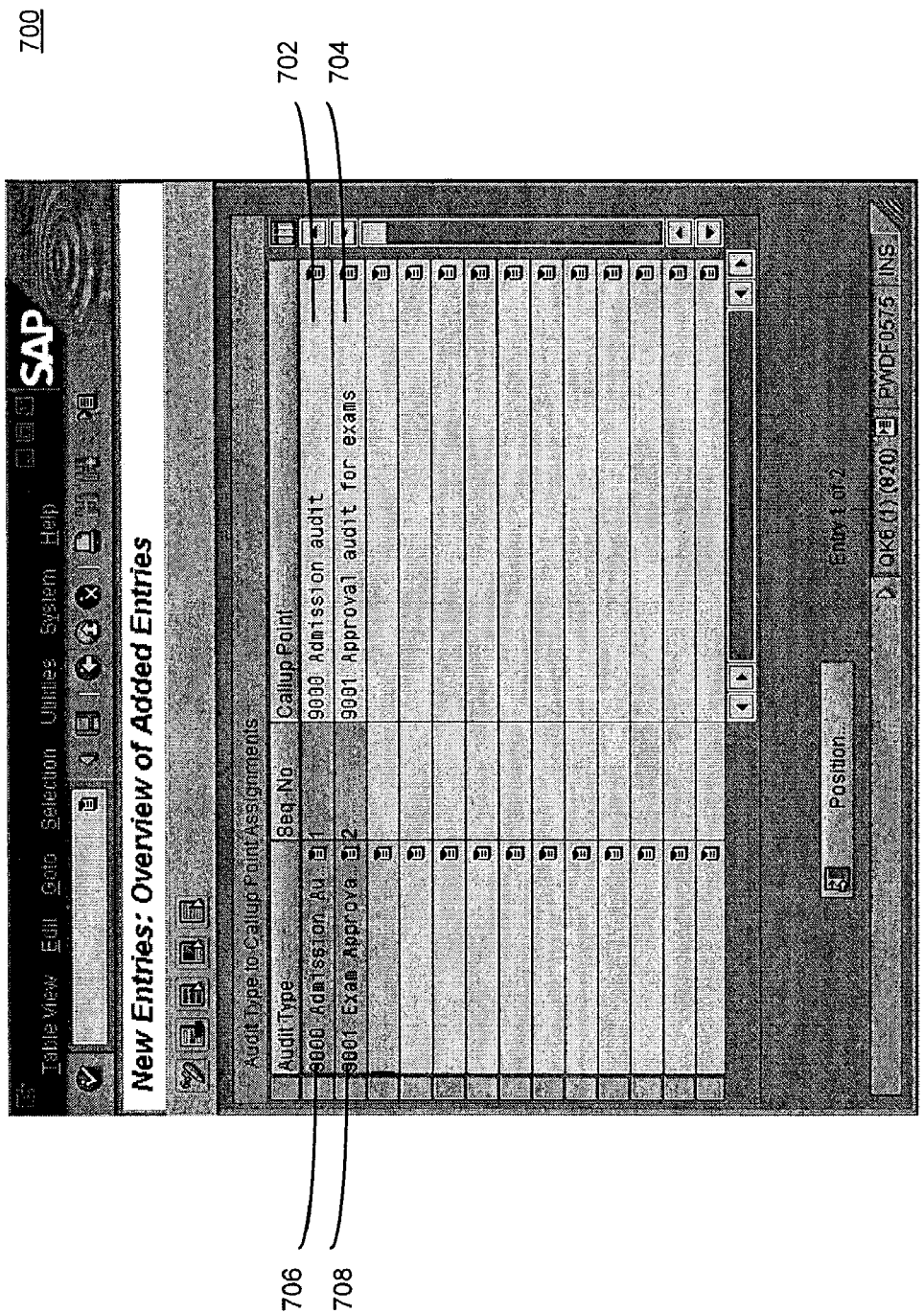
FIG. 7 is an illustration of an embodiment of a user interface for defining different audit types.

First, the processor 420 may define the type of audits the developer wishes to be performed on the entity. The processor 420 may do this by creating a name 706, 708 and call-up point 702, 704 representing the audit type. The processor 420 may also specify the version of the requirements (not shown) that the audit object will use when performing this audit type. FIG. 7 shows that two types of audits were defined: "Admission audit" with a call-up point of 9000 and "Approval audit for exams" with a call-up point of 9001.

The processor 420 may then define audit objects representing entities to be audited. The processor 420 may do this by creating all the components of an audit object as illustrated in FIG. 2, for example, including specifying one or more of the call-up points 702, 704 as attributes for the audit objects. As described previously, these call-up points may be referenced by requirement objects to link the requirement objects back to defined audit objects so that the audit objects may use the appropriate requirement objects to perform a particular type of audit.

Next, the processor 420 may define the requirements. The processor 420 may use either or both of two procedures to define requirements: (a) using abstract requirements, called requirement patterns, in order to facilitate requirement object generation, as illustrated in FIG. 8; or (b) defining a requirement object from scratch, as illustrated in FIG. 9.

Figure 8:
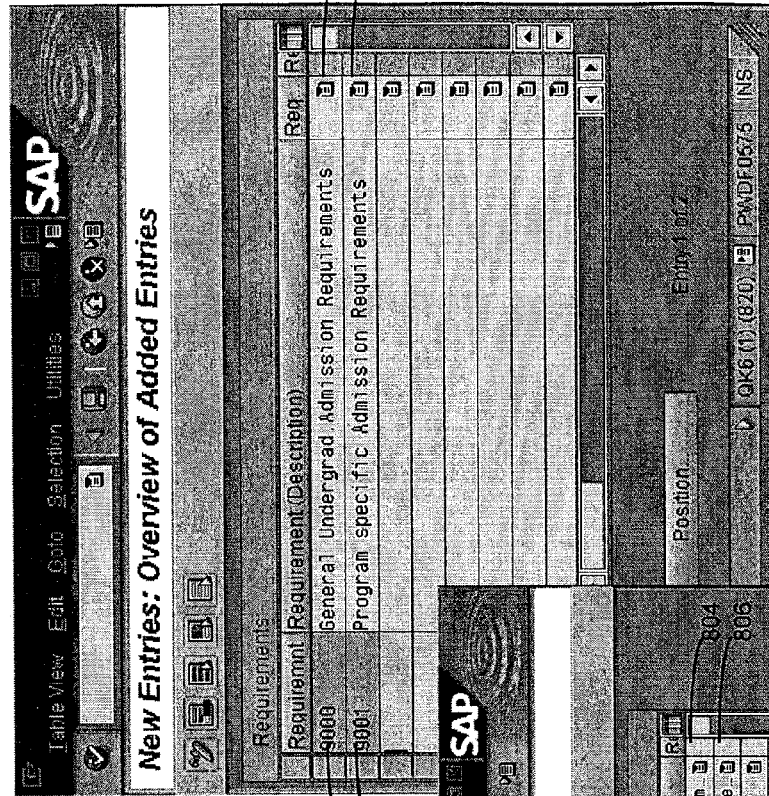
FIG. 8 is an illustration of an embodiment of a user interface for assigning requirement patterns to different audit types.
Figure 8:
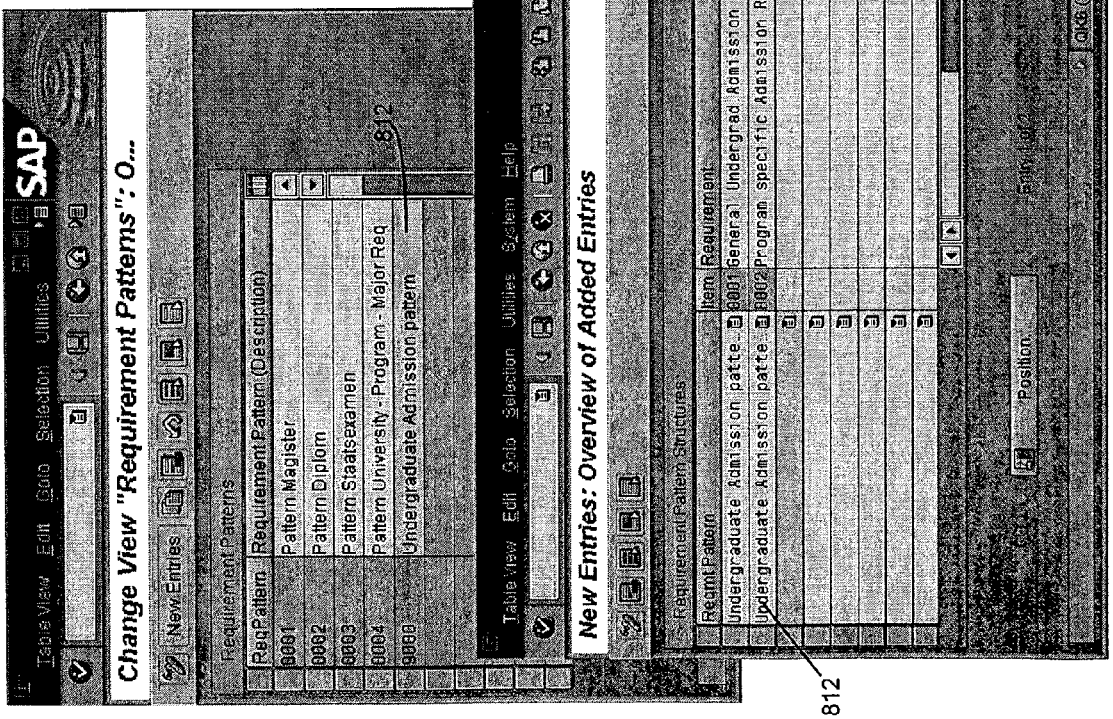
Figure 9:
FIG. 9 is an illustration of an embodiment of a user interface for defining requirements of an audit process.

In FIG. 8, the processor 420 uses requirement patterns to create requirement objects. Dialog 810 shows a list of predefined general requirement patterns. Requirement pattern 812 is an abstract requirement that, when implemented, may retrieve the requirement objects that are used in an admission audit.

In dialog 820, the processor 420 defines the two new requirement patterns 804, 806. A first requirement pattern is called "General Undergrad. Admission Requirements" 804 and a second requirement pattern is called "Program specific Admission Requirements" 806. The processor 420 also specifies the types of audits to which these requirement patterns are to apply. Requirement pattern 804 is to be associated with audit type 702. This indicates that the requirement objects to be retrieved for requirement pattern 804 may be used when an audit object performs an "Admission audit," as previously described in FIG. 7. Requirement pattern 806 is to be associated with audit type 704. This indicates that the requirement objects to be retrieved for requirement pattern 806 may be used when an audit object performs an "Approval audit for exams," as previously described in FIG. 7.

In this example, the two requirement patterns 804, 806 have several requirement objects in common, which are predefined for the general requirement pattern 812. So, to save time and effort, the processor 420 may easily assign the retrieval functionality of common requirement objects of requirement pattern 812 to the requirement pattern 804, 806, as done in dialog 830. Hence, these requirements (and any related subrequirements) defined therein are automatically associated with the newly defined requirement pattern 804, 806. Using requirement patterns speeds up the development process and reduces the number of inputs by the developer.

In FIG. 9, the processor 420 creates two requirements from scratch. In Dialog 902, the processor 420 may create a name "Abitur" 904 for a requirement object and a description of the requirement object 906. As will be described later, this requirement object includes an index-independent subrequirement object with a condition, where the condition is the completion of the Abitur. In Dialog 912, the processor 420 may create a name "Addtnl Admission Reqs for Dipl-Physics" 914 for a requirement object and a description of the requirement object 916. As will be described later, this requirement object includes an index-dependent subrequirement object, which calculates admission requirements for this program of study.

In one embodiment, the processor 420 may use requirement patterns and supplement them with requirements defined from scratch. Alternatively, the processor 420 may use requirement patterns entirely or solely define requirements from scratch.

Next, the processor 420 may define subrequirements to be associated with the requirements. In defining subrequirements, a processor 420 may define the performance index data and the condition data, define the subrequirement objects, and then assign the performance index and condition data to the appropriate subrequirement objects.

Figure 10:
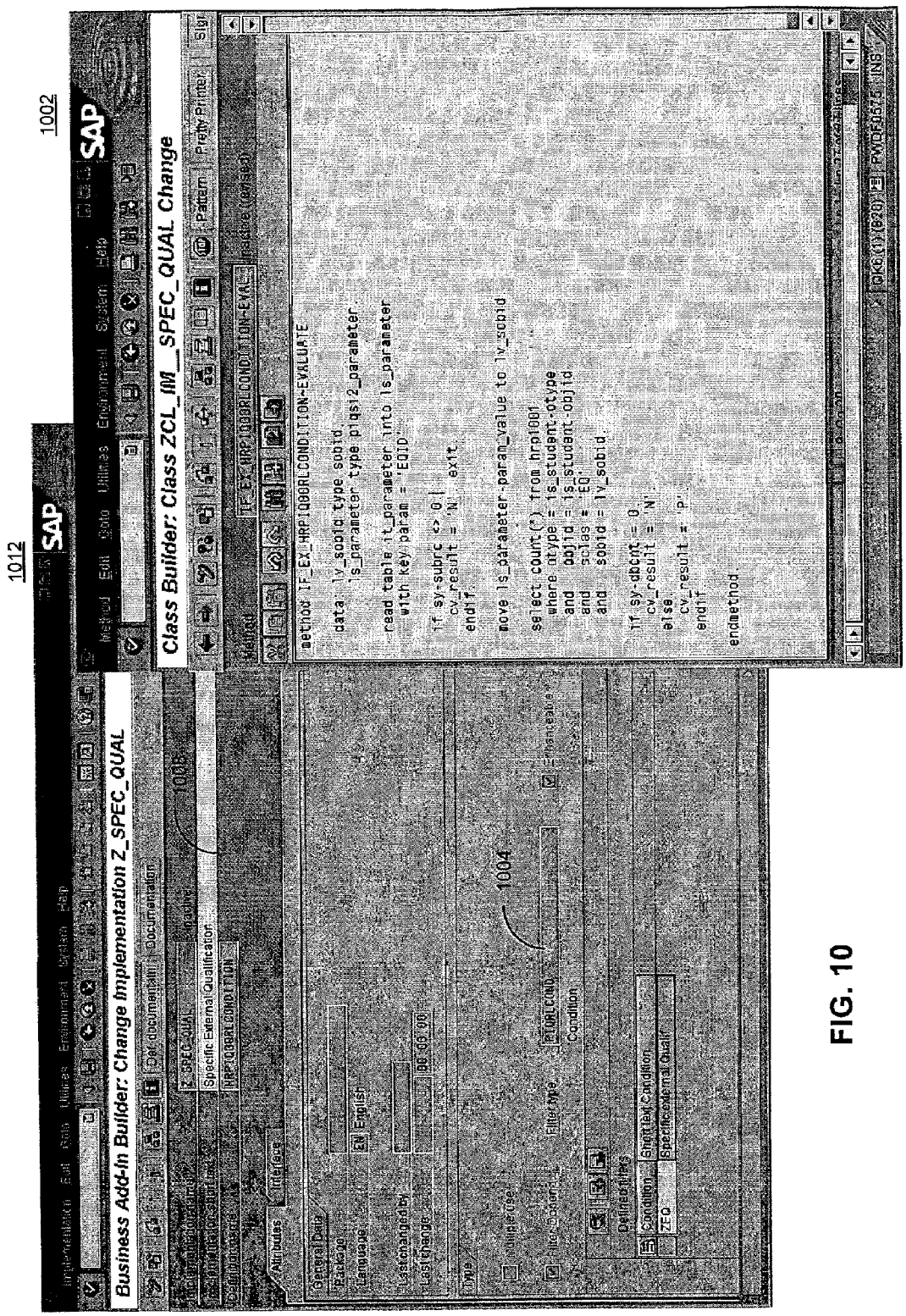
FIG. 10 is an illustration of an embodiment of a user interface for defining index-independent subrequirements of an audit process.

FIG. 10 shows an exemplary implementation of the index-independent subrequirement object associated with the requirement object "Abitur" 904. Here, a condition must be checked in order to satisfy the subrequirement object and, hence, the requirement object. The condition data for this subrequirement object includes a condition name 1008 of "Specific External Qualification" and the filter used 1004 to search for the data used in the condition check. Dialog 1002 shows exemplary code that performs the condition check to determine whether the Abitur has been completed.

Figure 11:
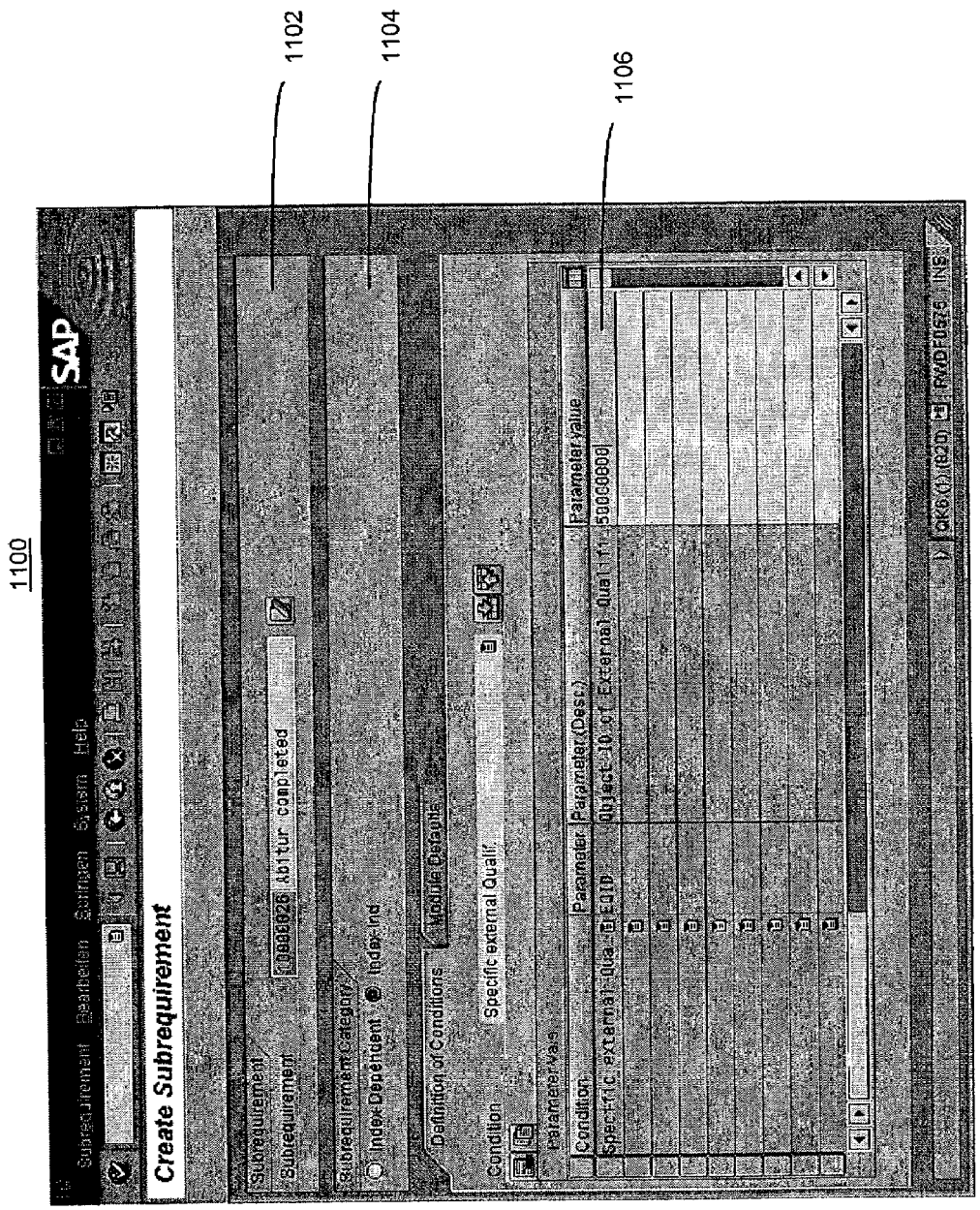
FIG. 11 is an illustration of an embodiment of a user interface for further defining index-independent subrequirements of an audit process.

FIG. 11 shows further defining of the index-independent subrequirement object that includes the condition described in FIG. 10. The processor 420 may first define a name 1102 for the subrequirement object, then indicate that the subrequirement object is index-independent 1104. Lastly, the processor 420 may associate the previously defined condition data with this subrequirement object 1106. Accordingly, when the requirement object "Abitur" is called, the subrequirement object will check whether the Abitur was completed.

Figure 12:
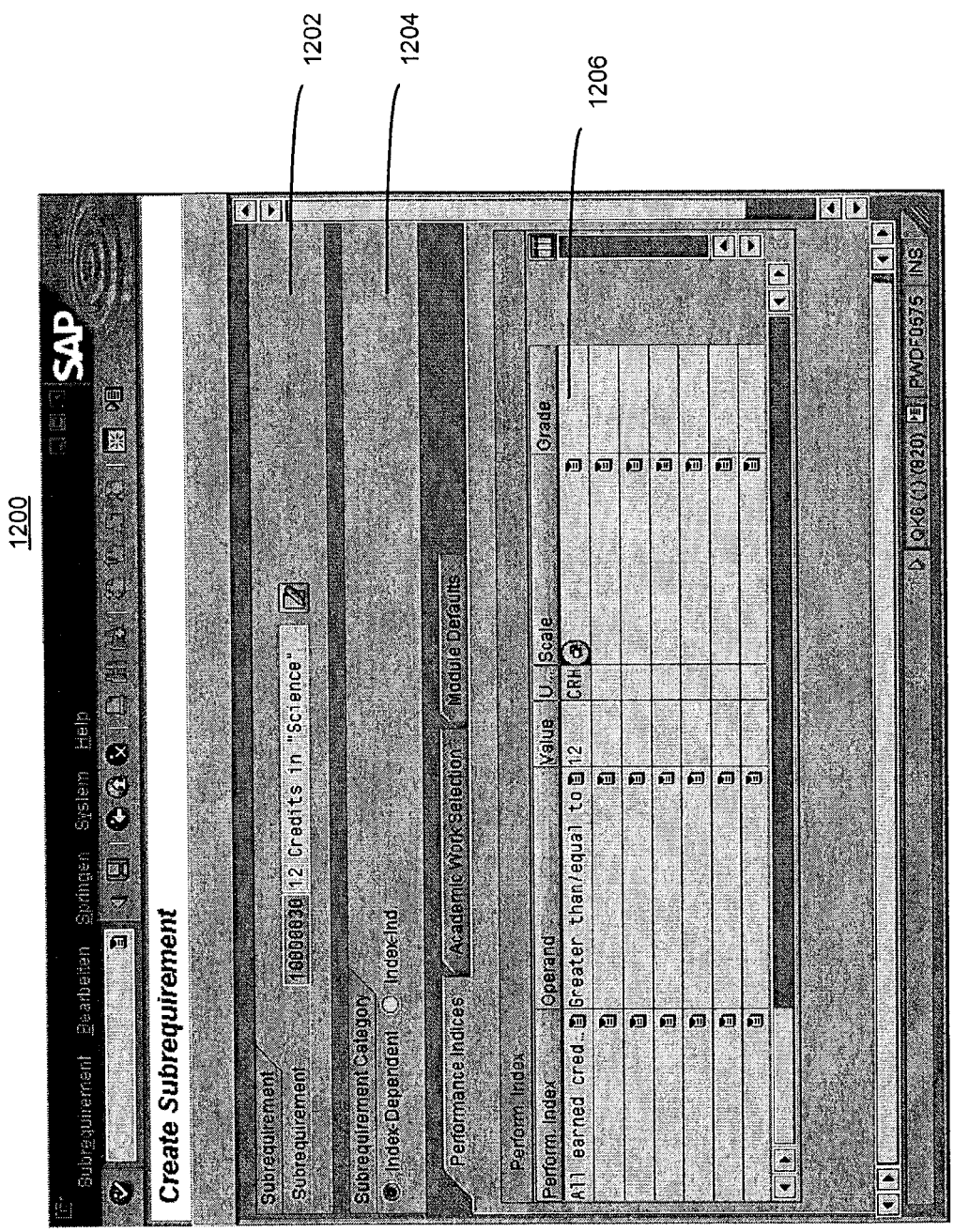
FIG. 12 is an illustration of an embodiment of a user interface for defining index-dependent subrequirements of an audit process.

FIG. 12 shows the defining of the index-dependent subrequirement object included in the requirement object 914 of FIG. 9. The processor 420 may first define a name 1202 for the subrequirement object. The processor 420 may then indicate that the subrequirement object is index-dependent 1204. Lastly, the processor 420 may input the performance indices, nominal values, filter, etc., 1206 that may be used to calculate whether the subrequirement is satisfied. In this example, the subrequirement calls for the completion of 12 credits in Science. So, a filter may be used to search a student's records and extract a list of all the science courses that the student has completed and/or is currently taking. A nominal value may be set at 12 credits. These nominal values that are input to this subrequirement may be predefined and automatically assigned to this subrequirement object by the processor 420 or may be defined and manually input by the developer. A performance index may be used to sum up all the credits from the extracted courses and compare the summed credits against the nominal value to see if the summed credits are greater than or equal to 12.

In an alternate embodiment, rather than do the assignments of objects through the previously described procedures, the processor 420 may link requirement objects to a particular audit object by drag-and-drop in the user interface. In this case, the requirement objects may be displayed by the user interface in one list and the audit objects in another. The processor 420 may then receive inputs from the mouse to select and move the requirement objects to the particular audit object. The processor 420 may then automatically link the requirement objects to the corresponding audit object. Similarly, the processor 420 may assign subrequirement objects to a particular requirement object by drag-and-drop in the user interface.

Figure 13:
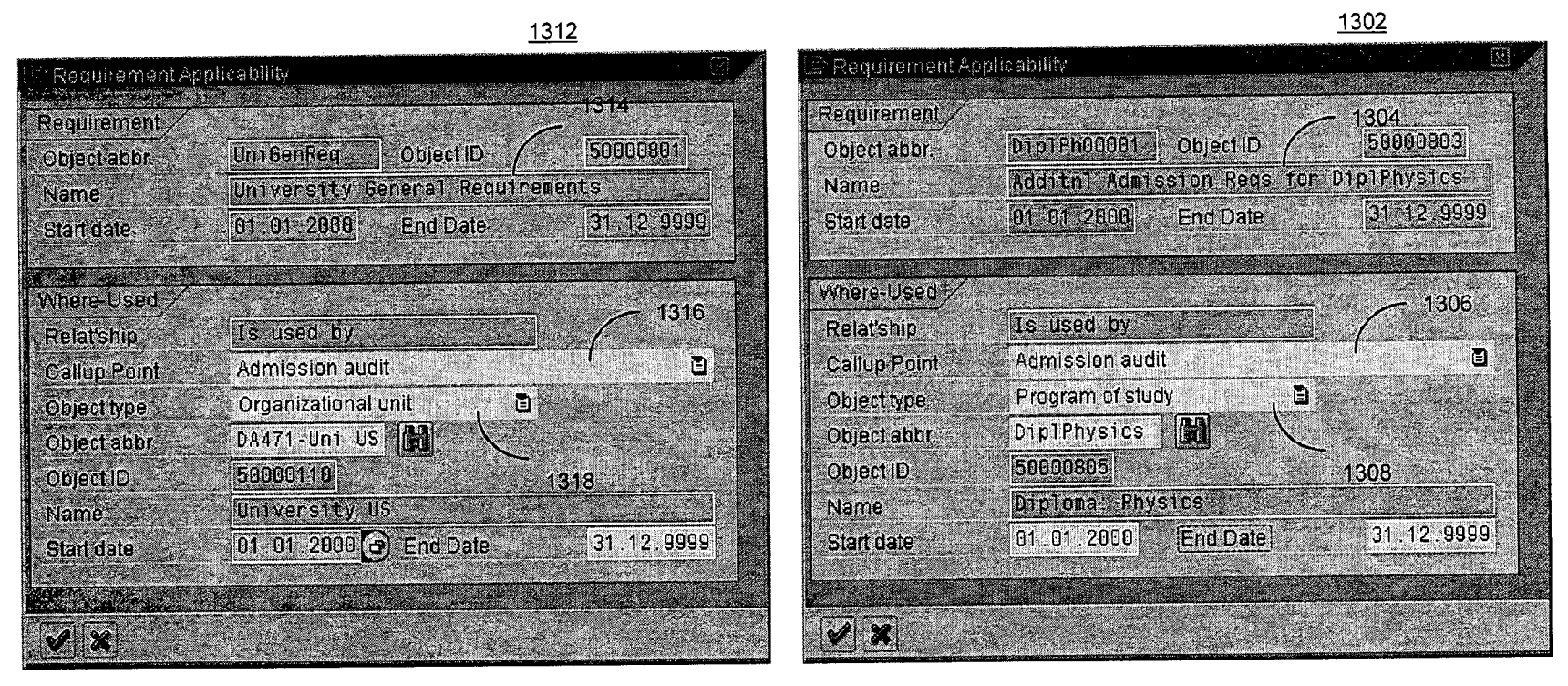

Alternatively, the processor 420 may link requirement objects to a particular audit object through a dialog in the user interface. FIG. 13 shows an example of a dialog 1002, 1012 in which the processor 420 may assign requirement objects 1004, 1014 to audit objects 1008, 1018 for performance of audit process 1006, 1016 (indicated by call-up points), respectively.

Figure 14:
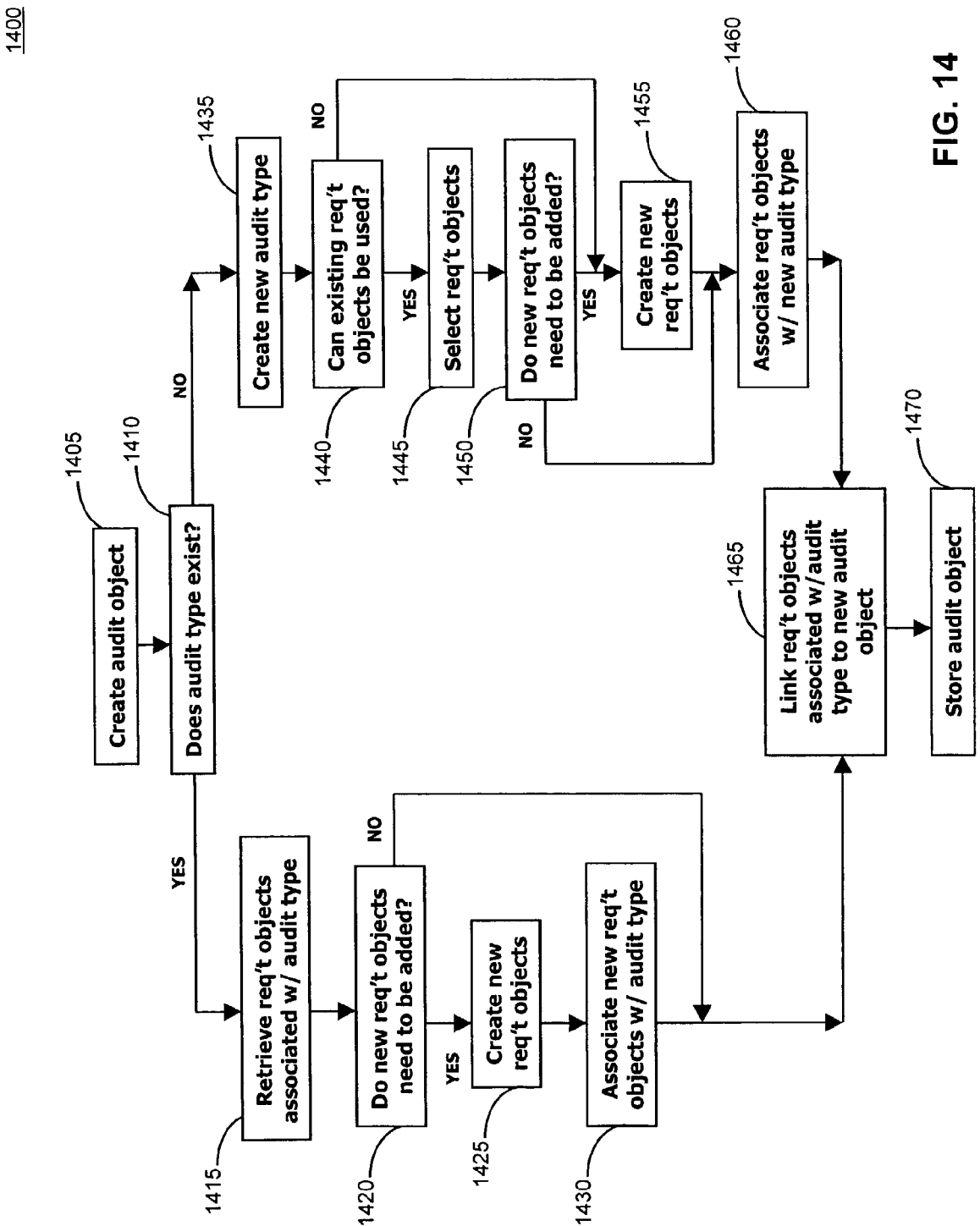
FIG. 14 is a flowchart of an embodiment of a method according to the present invention.

FIG. 14 is a flowchart of an embodiment of a method for using a framework for implementing an audit process according to the present invention. The processor 420 may receive a request from a developer to implement an audit process for a particular entity. The processor 420 may create (1405) an audit object to represent the entity. The audit object may include the components illustrated in FIG. 2, for example. Next, the processor 420 may retrieve the list of previously defined types of audits from memory 430 or storage 440. The processor 420 may then inquire (1410) of the developer if the audit type to be performed on the entity is in the list.

If the audit type is in the list, then the processor 420 may retrieve (1415) the requirement and subrequirement objects associated with the audit type. These objects may now be used when the created audit object performs the audit type. Accordingly, the processor 420 may not have to create new requirement and subrequirement objects.

The audit object may have additional requirements to be met that are not part of the requirement and subrequirement objects associated with the audit type. So, the processor 420 may inquire (1420) whether additional requirement and subrequirement objects should be added. If so, the processor 420 may create (1425) new requirement and subrequirement objects. These new objects may include the components illustrated in FIG. 2, for example. The processor 420 may then associate (1430) the new requirement and subrequirement objects with the audit type. Now, the audit type has associated with it existing and new requirement and subrequirement objects.

After creating new requirement and subrequirement objects to go along with the existing ones, the processor 420 may link (1465) the requirement and subrequirement objects with the newly created audit object and then store (1470) the audit object.

If there are no new requirement and subrequirement objects to be added (1420), then the audit type has associated with it only the existing requirement and subrequirement objects. Thus, the processor 420 may link (1465) the existing requirement and subrequirement objects with the newly created audit object and then store (1470) the audit object.

If the processor 420 inquires (1420) of the developer whether the audit type to be performed is listed and the developer responds that it is not, then the processor 420 may create (1435) a new audit type. The new audit type may have some requirements having requirement objects already created by the processor 420. Hence, the processor 420 may inquire (1440) whether any of the existing requirement and subrequirement objects may be associated with this new audit type. If so, the processor 420 may select (1445) those objects.

Again, the audit object may have additional requirements to be met that are not represented by requirement and subrequirement objects. So, the processor 420 may inquire (1450) whether additional requirement and subrequirement objects should be added. If so, the processor 420 may create (1455) new requirement and subrequirement objects. These new objects may include the components illustrated in FIG. 2, for example. The processor 420 may then associate (1460) the new and selected existing requirement and subrequirement objects with the new audit type. The new audit type has associated with it selective existing and new requirement and subrequirement objects.

If none of the existing requirement and subrequirement objects are appropriate for the new audit type (1440), then the processor 420 may create (1455) all new requirement and subrequirement objects, which include the components illustrated in FIG. 2, for example. The processor 420 may then associate (1460) the new requirement and subrequirement objects with the new audit type.

After creating the new audit type, the processor 420 may link (1465) the requirement and subrequirement objects with the newly created audit object and then store (1470) the audit object.

The processor has now completed an implementation of an audit process using the framework of the present invention and may now run the audit process to perform different audit processes.

In alternate embodiments, a method may implement the objects of the audit process in a different order.

It may be understood that the structure of the software used to implement the embodiments of the invention may take any desired form, such as a single or multiple programs. It may be further understood that the method of an embodiment of the present invention may be implemented by software, hardware, or a combination thereof.

The above is a detailed discussion of the preferred embodiments of the invention. The full scope of the invention to which applicants are entitled is defined by the claims hereinafter. It is intended that the scope of the claims may cover other embodiments than those described above and their equivalents.

What is claimed is:

1. A computer-implemented method of adding a new audit object to an audit framework comprising a plurality of audit objects, each audit object representing an entity to be audited, each audit object containing data on the entity, each audit object having a plurality of links to requirement object associated therewith, a plurality of the requirement objects, each requirement object representing an audit requirement to be satisfied, each requirement object having a plurality of links to sub-requirement objects, and a plurality of the sub-requirement objects, each sub-requirement object representing an audit condition to be satisfied, wherein the audit framework possesses a generally many-to-many relationship among audit objects and requirement objects and a generally many-to-many relationship among requirement objects and sub-requirement objects, and wherein each audit object further comprises a plurality of types, each type having a plurality of links to requirement objects associated therewith, the method comprising:

if an audit type to be performed on an entity represented by the new audit object is already defined:

identifying a first set of the requirement objects associated with the audit type, storing links of the identified set of requirement objects in a definition of the new audit object, otherwise:

creating the audit type to be performed on the entity, selecting a second set of the requirement objects to be associated with the audit type, storing links of the selected set of requirement objects in a definition of the new audit object; and generating new requirement objects for any other audit provisions not represented by the first or second set of requirement objects and storing links of the new requirement objects in the definition of the new audit object.

2. A computer-implemented method to conduct an audit on an entity, comprising:

responsive to a request to conduct the audit, retrieving an audit object containing data on the entity, the audit object having previously been created by:

associating an audit type to the audit object, identifying a first set of requirement objects associated with the audit type, each requirement object representing a plurality of audit conditions, generating a second set of requirement objects not represented by the first set of requirement objects, each requirement object representing a plurality of audit conditions, and storing links of the first and second sets of requirement objects in the audit object;

retrieving the linked first and second sets of requirement object found in the audit object;

comparing the data of the audit object to the audit conditions of the linked requirement objects to deter mine whether the audit object satisfies the audit conditions and thus the audit; and storing the result of the comparison for later use.

3. A computer-implemented audit system, comprising:

a memory having an audit framework stored therein, the audit framework comprising:

a plurality of audit objects, each audit object representing an entity to be audited, each audit object containing data on the entity, each audit object having a plurality of links to requirement objects associated therewith, a plurality of the requirement objects, each requirement object representing an audit requirement to be satisfied, each requirement object having a plurality of links to sub-requirement objects, and a plurality of the sub-requirement objects, each sub-requirement object representing an audit condition to be satisfied, wherein the audit framework possesses a generally many-to-many relationship among audit objects and requirement objects and a generally many-to-many relationship among requirement objects and sub-requirement objects, and wherein each audit object further comprises a plurality of types, each type having a plurality of links to requirement objects associated therewith; and a processor configured to add a new audit object to the audit framework by:

if an audit type to be performed on an entity represented by the new audit object is already defined:

identifying a first set of the requirement objects associated with the audit type, storing links of the identified set of requirement objects in a definition of the new audit object, otherwise:

creating the audit type to be performed on the entity, selecting a second set of the requirement objects to be associated with the second audit type, storing links of the second set of requirement objects in a definition of the new audit object, and generating new requirement objects for any other audit provisions not represented by the first or second set of requirement objects and providing links of the new requirement objects in the definition of the new audit object.

4. A machine-readable medium, on which is stored program instructions that, when executed by a processor, cause the processor to:

generate an audit framework comprising:

a plurality of audit objects, each audit object representing an entity to be audited, each audit object containing data on the entity, each audit object having a plurality of links to requirement objects associated therewith, a plurality of the requirement objects, each requirement object representing an audit requirement to be satisfied, each requirement object having a plurality of links to sub-requirement objects, and a plurality of the sub-requirement objects, each sub-requirement object representing an audit condition to be satisfied, wherein the audit framework possesses a generally many-to-many relationship among audit objects and requirement objects and a generally many-to-many relationship among requirement objects and sub-requirement objects, and wherein each audit object further comprises a plurality of types, each type having a plurality of links to requirement objects associated therewith; and add a new audit object to the audit framework by:

if an audit type to be performed on an entity represented by the new audit object is already defined:

identifying a first set of the requirement objects associated with the audit type, storing links of the identified set of requirement objects in a definition of the new audit object, otherwise:

creating the audit type to be performed on the entity, selecting a second set of the requirement object to be associated with the second audit type, storing links of the selected set of requirement objects in a definition of the new audit object, and generating new requirement objects for any other audit provisions not represented by the first or second set of requirement objects and providing links of the new requirement objects in the definition of the new audit object.

* * * * *